United States Patent [19]
Walquist

[11] 3,712,404
[45] Jan. 23, 1973

[54] HILLSIDE TRACTOR

[75] Inventor: Kermit H. Walquist, New Richmond, Wis.

[73] Assignee: Shur Foot Tractor Company, New Richmond, Wis.

[22] Filed: Dec. 11, 1970

[21] Appl. No.: 97,128

[52] U.S. Cl. ..................... 180/41, 180/66, 280/6 H, 172/406, 172/421
[51] Int. Cl. ..................... B60g 17/00, B60k 3/00
[58] Field of Search ............. 172/421, 406; 56/209; 280/43.13, 6.11, 6 H; 180/41, 66

[56] References Cited

UNITED STATES PATENTS

| | | | |
|---|---|---|---|
| 689,001 | 12/1901 | Hill | 180/54 F |
| 3,008,724 | 11/1961 | Lapins et al. | 56/209 X |
| 3,182,444 | 5/1965 | Quayle | 180/66 R X |
| 3,250,340 | 5/1966 | Roberson | 180/44 F |
| 3,261,421 | 7/1966 | Forster et al. | 180/66 R X |
| 3,309,097 | 3/1967 | Seeber | 280/6.11 |
| 3,370,666 | 2/1968 | Holtzclaw | 180/26 R |
| 3,442,526 | 5/1969 | Olson | 280/43.13 |
| 3,519,097 | 7/1970 | Commons | 180/26 R |

*Primary Examiner*—Albert J. Makay
*Attorney*—Robert M. Dunning

[57] ABSTRACT

A hillside tractor is provided capable of maintaining the engine and operator's platform level while the tractor travels along the sides of hills, for mowing the hillsides or doing other work. The tractor is hydraulically driven by pumps powered by an internal combustion engine. The frame of the device comprises an elongated large diameter tubular member which functions as a chassis and also as a hydraulic fluid reservoir.

9 Claims, 16 Drawing Figures

PATENTED JAN 23 1973 3,712,404
SHEET 1 OF 5
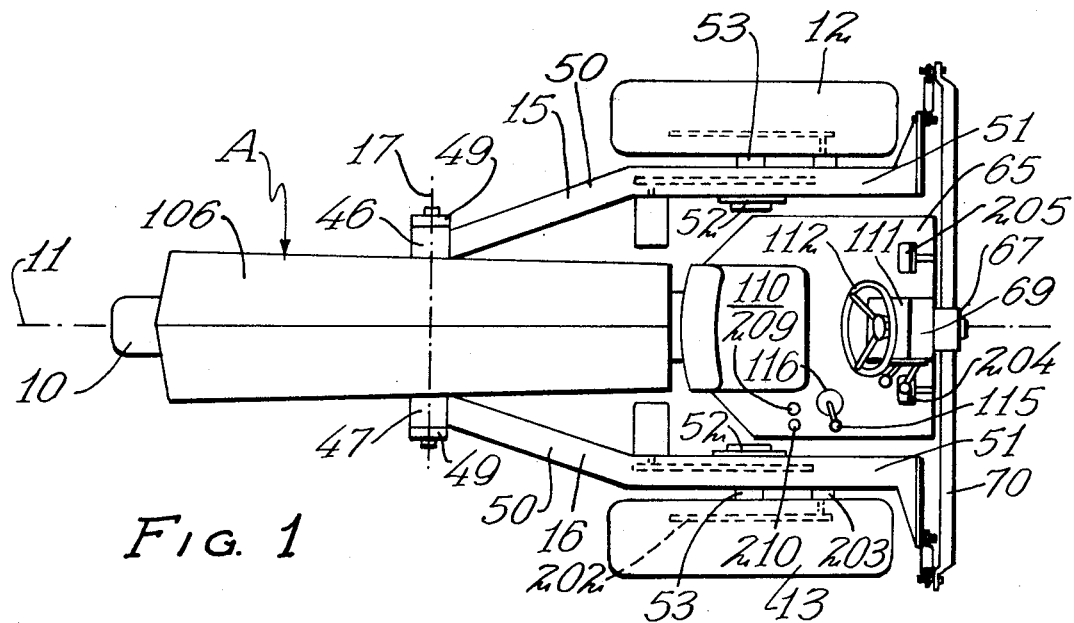
Fig. 1
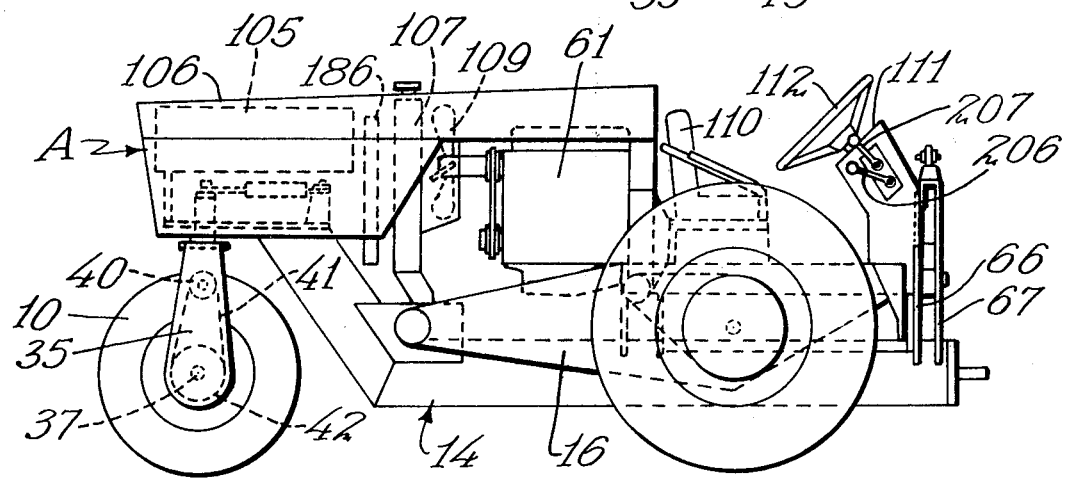
Fig. 2
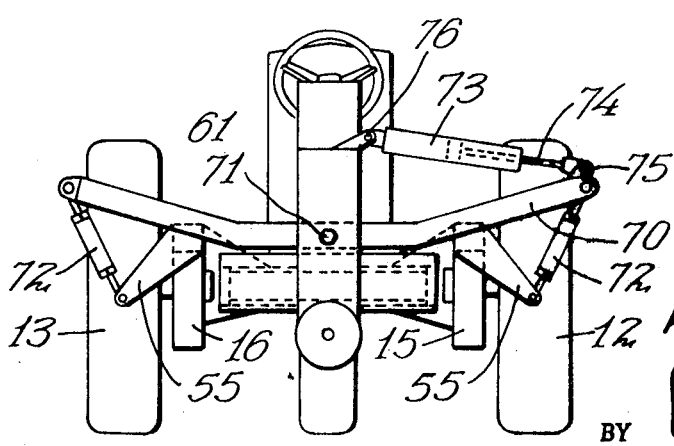
Fig. 3
Fig. 4
INVENTOR
KERMIT H. WAHLQUIST
BY Robert M. Dunning
ATTORNEY INVENTOR
KERMIT H. WAHLQUIST
BY Robert M. Dunning
ATTORNEY

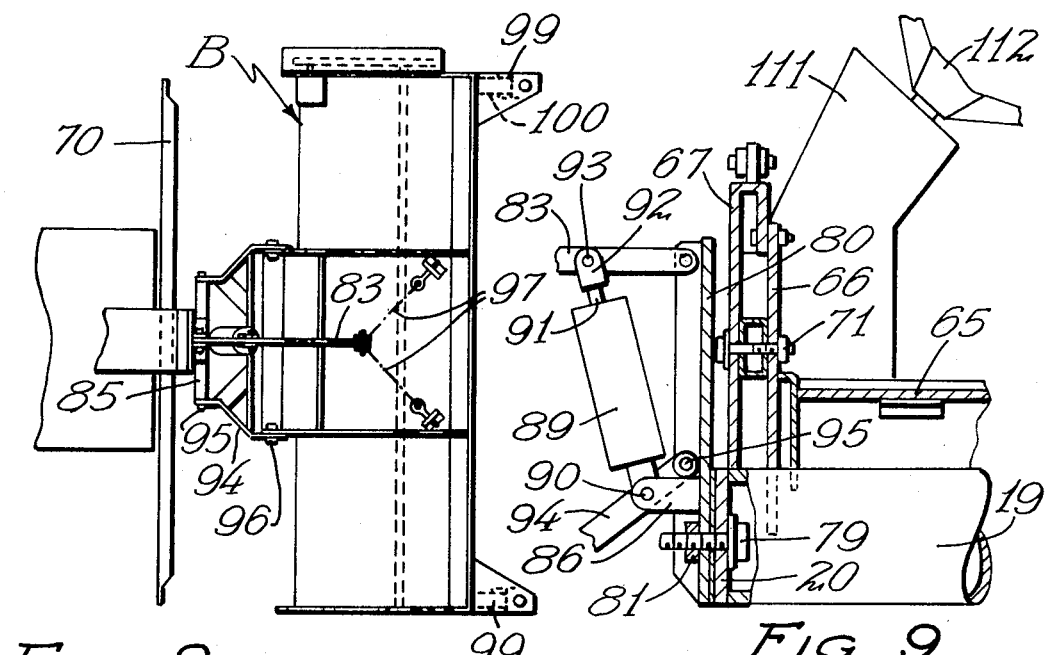
FIG. 8
FIG. 9
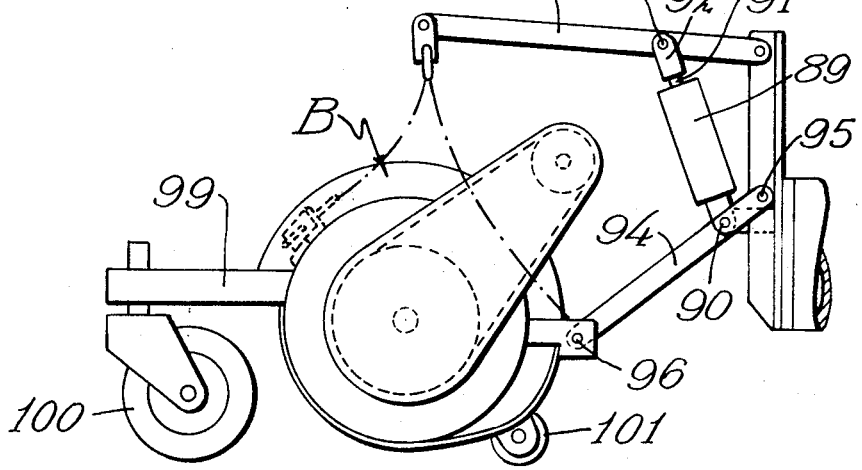
FIG. 10
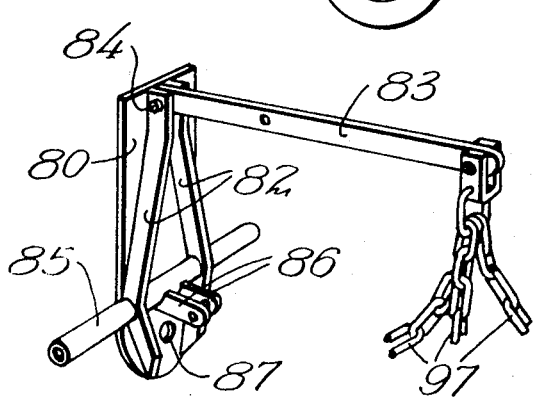
FIG. 11
INVENTOR
KERMIT H. WAHLQUIST
BY Robert M. Dunning
ATTORNEY

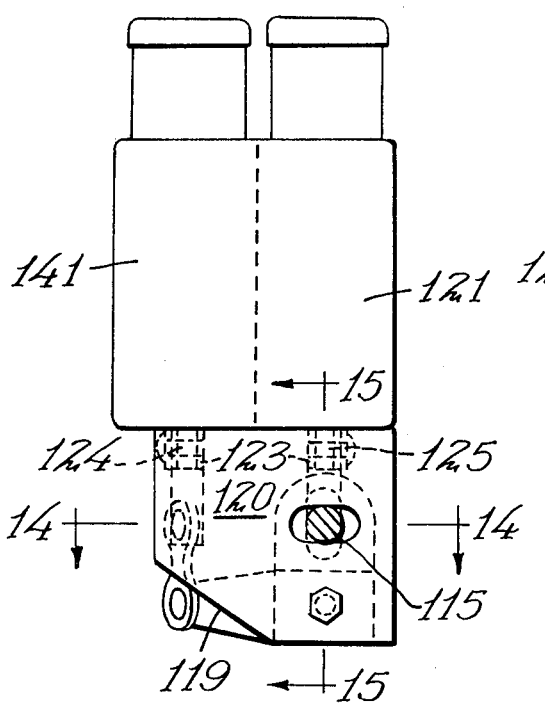
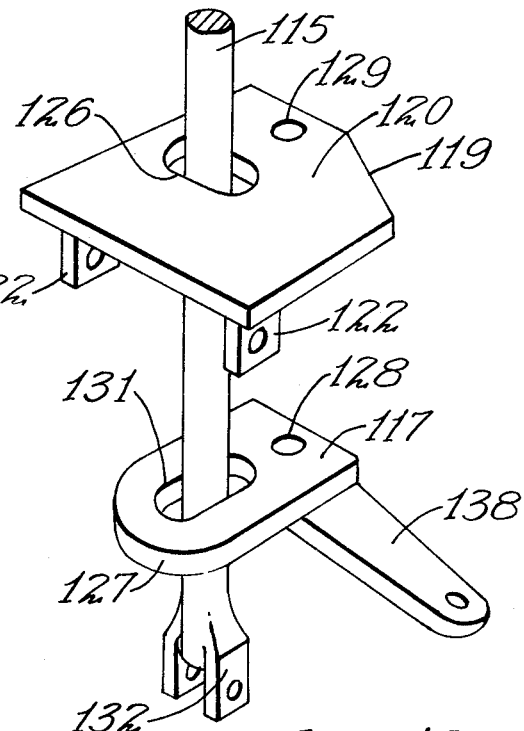
FIG. 13          FIG. 12
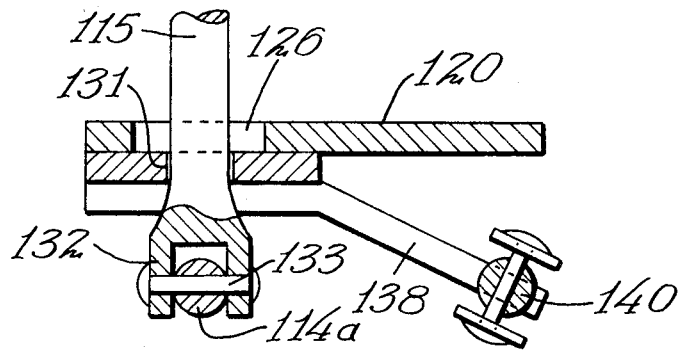
FIG. 14
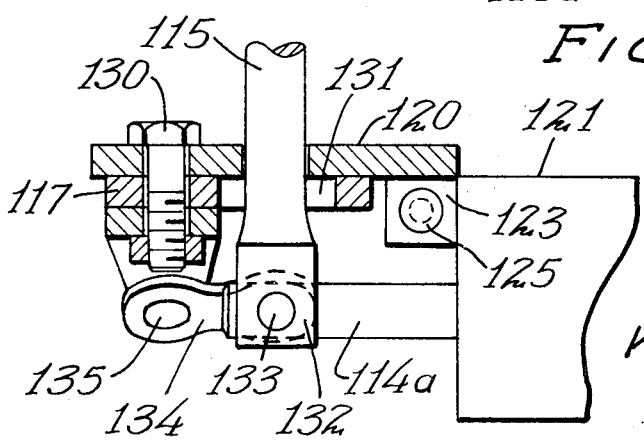
FIG. 15
INVENTOR
KERMIT H. WAHLQUIST
BY Robert M. Dunning
ATTORNEY

HILLSIDE TRACTOR

This invention relates to an improvement in hillside tractors and deals particularly with a tractor useful in mowing the grass on hillsides and travelling on slopes too steep to be comfortably travelled by tractors of conventional type.

BACKGROUND OF THE INVENTION

In U.S. Pat. No. 3,442,526 issued May 6, 1969 in the name of Alvin F. Olsen, a tractor mower was illustrated for use in mowing hillsides. This tractor included a single steering wheel at one end of the frame on the longitudinal axis of the tractor, and two opposed wheels at the other end of the frame on opposite sides of the longitudinal axis. Each wheel of this pair was mounted on an elongated wheel support, the two supports being pivotally supported on a common transverse axis, and means was provided to raise one wheel on one side of the frame and to simultaneously lower the other wheel on the opposite side of the frame.

Tractors of this type have now been produced, and operate very effectively. However, as is almost inevitable in producing anything novel, improvements have been found desirable. As indicated in the above mentioned patent, the tractors produced are hydraulically operated. An internal combustion engine drove a hydraulic pump which in turn drove individual hydraulic motors connected to the three wheels. Hydraulic power was also used for steering and for tilting the tractor. The rectangular chassis or frame was made as low as possible in order to maintain a low center of gravity. However, this tended to limit the adjustability of the side wheels, and also tended to lower the angle of slope over which the tractor could move while the body was maintaining a level plane.

SUMMARY OF THE INVENTION

An object of the present invention resides in the provision of a hillside tractor which functions much in the manner of the previous construction described, but which is materially improved thereover. As now constructed, an elongated tubular frame is provided having one end inclining upwardly and rearwardly to provide a support for the steering wheel. This tubular frame extends along the longitudinal axis of the tractor to serve as a support for the motor and hydraulic equipment as well as the driver's platform. This tubular frame serves as a reservoir for the hydraulic fluid so as to maintain the weight of the fluid at a very low level, thus permitting the center of gravity to be materially lowered while at the same time providing a materially greater wheel elevation variation. As a matter of fact, the tractor is capable of holding the motor, the operator's platform and the controls on a level plane on a thirty-five degree slope.

A feature of the present invention resides in the formation of this elongated tubular frame. The frame includes an elongated large diameter steel tube having an upwardly and rearwardly inclined end terminating in a horizontal steering platform. The single rear wheel is mounted directly beneath the vertical pivot about which the wheel support may turn for steering purposes. With this arrangement a tractor is provided which has a turning radius which is less than the length of the tractor. As an example, a tractor having a total length of 135 inches has a turning radius of 96 inches, making the device extremely maneuverable and easy to handle.

A feature of the present invention resides in the provision of a transversely extending pivot support fixed to the frame nearer the rear end of the frame than the front end thereof, and in pivotally supporting a pair of wheel supporting arms on this common pivot on opposite sides of the tractor, the arms extending forwardly to position the wheels near the forward end of the tractor. The wheels supported by these arms are individually driven, and the hydraulic system is such as to permit one wheel to rotate at a slower speed with a consequent increase in speed of the other wheel.

A further feature of the present invention lies in the provision of an elongated transverse arm which is centrally pivoted to a column situated on the forward end of the frame. The ends of this arm are connected to the ends of the wheel supporting arms by links so that by pivoting the transverse arm about its center axis which is parallel to the longitudinal axis of the frame, one wheel supporting arm may be pivoted downwardly. A hydraulic cylinder is connected between the vertical frame column and one end of the transverse arm to pivotally adjust the arm.

A further feature of the present invention resides in the provision of a hydraulic system which provides a range of speeds both for the movement of the tractor along the ground, and also for driving the power take-off or driving the mower or other device. In preferred form, the hydraulic system includes four hydraulic pumps driven by an internal combustion engine. Two of these pumps are usually used both for providing the desired speed range. One of these pumps is a smaller capacity pump used for providing a first speed range. The other of these pumps is a larger capacity pump used to provide a higher speed range. The combined capacity of the two pumps may be used for providing a third speed range. Any of these speed ranges may be obtained by operation of a simple control lever.

A further feature of the present invention resides in a construction of the type described in which the hydraulic system includes a simple reversing valve which may drive the transport motors selectively in either direction. In its center position, the fluid is pumped back to the reservoir. The system also includes a valve which may serve as a clutch operated by a suitable foot pedal so that when the pedal is depressed the fluid will by-pass to the reservoir and when pressure is relaxed, the full drive pressure will flow to the transport motors. This valve provides a variable speed control in intermediate positions of the foot pedal so that the vehicle may move at an extremely slow rate if desired without effecting the speed of the mower or other mechanism controlled by the power take-off.

A further feature of the present invention resides in the provision of a lever supported for movement either in a side to side direction or a forward and rearward direction. Movement of this lever to the right tilts the machine to the right while moving the lever to the left tilts the machine to the left so that the operator may readily control the apparatus to follow the contour of the ground. Movement of this same lever to the rear raises the mower, and movement to the front lowers the mower. The circuit to the cylinder for lifting and lowering the motor includes a restriction in the line as the mower is lowered while permitting the mower to be quickly elevated.

These and other objects and novel features of the present invention will be more clearly and fully set forth in the following specification and claims.

BRIEF DESCRIPTION OF THE DRAWINGS

Forming a part of the invention

FIG. 1 is a top plan view of the tractor showing the general arrangement of parts therein.

FIG. 2 is a side elevational view of the structure illustrated in FIG. 2.

FIG. 3 is a front elevational view of the structure shown in FIGS. 1 and 2.

FIG. 4 is a detailed view of an end portion of one of the wheel supports.

FIG. 8 diagramatically illustrates a mower which is attached to the forward end of the tractor body.

FIG. 9 is a detailed view of the front of the tractor, portions of the structure being broken away to disclose the construction thereof.

FIG. 10 is a side elevational view of a mower of the type shown in FIG. 8.

FIG. 11 is a diagramatic view of the means for raising the mower out of contact with the ground.

FIG. 12 is a diagramatic perspective view in exploded form showing the tilt control and the means of lifting and lowering the mowing apparatus.

FIG. 13 shows the apparatus of FIg. 12 connected to the tilt and lift valve.

FIG. 14 is a vertical detail section, the position of the section being indicated by the line 14-14 of FIG. 13.

FIG. 15 is another detail sectional view, the position of the section being indicated by the line 15—15 of FIG. 13.

DESCRIPTION OF THE PREFERRED EMBODIMENT

Figure 5:
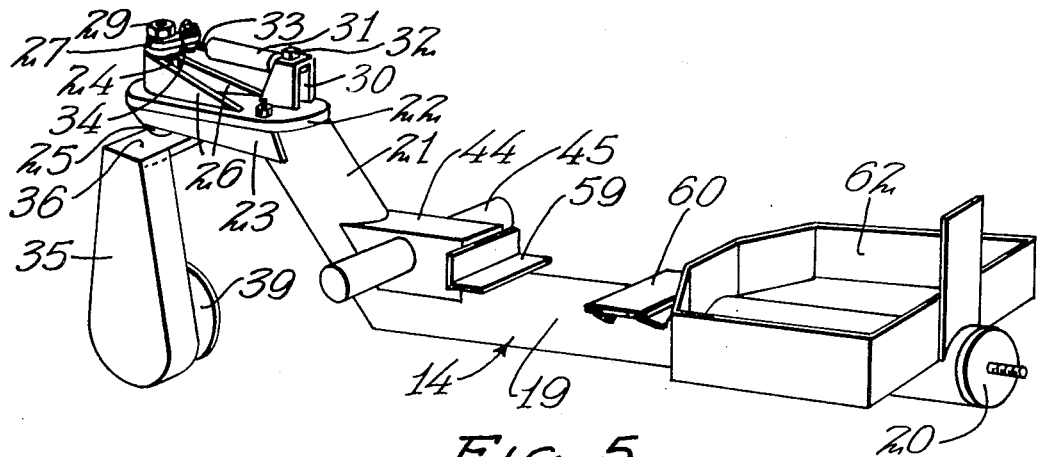
FIG. 5 is a diagrammatic view of the frame with most of the superstructure removed.

In general, the tractor is indicated by the letter A and is supported by a single rear wheel 10 which is substantially centered with respect to the longitudinal center line 11, and by front wheels 12 and 13. The wheels 10, 12 and 13 support a frame which is indicated in general by the numeral 14. The front wheels 12 and 13 are supported by wheel supporting arms 15 and 16 which are pivotally supported about a common axis 17 which extends at right angles to the longitudinal axis 11. This will be clarified after a more complete description of the construction.

The tractor frame is believed unique as it not only serves as the support for the units of the tractor, but also acts as a hydraulic fluid reservoir. The frame 14 includes an elongated tube 19 which is normally made of steel or other similar rigid material, and which is closed at its front end with a front closure plate 20. The rear end of the tube 19 is connected to a tubular frame member 21 which inclines upwardly and rearwardly from the rear end of the tube 19, and the interior of which is in communication therewith. The upper end of the inclined frame member 21 is closed by a substantially horizontal steering platform 22 which is reinforced by a downwardly extending reinforcing skirt 23. A vertical bearing 24 is supported on the plate 22, and supports a vertical shaft 25. Reinforcing gusset plates 26 hold the bearing 24 in vertical position upon the plate 22. The shaft 25 supports a steering arm 27 which is held in place by nuts 29 or other suitable means.

An inverted generally U-shaped bracket 30 is mounted upon the platform 22 near the forward end thereof. A hydraulic cylinder 31 is pivotally connected by a vertical pivot 32 to the bracket 30, and a piston rod in the cylinder 31 is indicated at 33 and is pivotally connected at 34 to the arm 27. Expansion and contraction of the piston-cylinder device acts to rotate the vertical shaft 25 about its vertical axis. A housing 35 is mounted upon a horizontally extending arm 36 attached to the lower end of the shaft 25. The housing 35 supports a horizontal shaft 37 which in turn supports a plate 39 to which the rear wheel 10 is secured. As is indicated in FIG. 2 of the drawings, a hydraulic motor 40 is supported within the housing 35 and includes a drive gear connected by a chain 41 to a cooperable gear or sprocket 42 on the shaft 37. Alternatively, the motor 40 may be mounted concentrically with the shaft 37 to eliminate the chain drive.

With reference again to FIG. 5 of the drawings, it will be noted that a box like support 44 is welded or otherwise secured to the tubular members 19 and 21 at the juncture thereof. This frame member 44 not only reinforces the joint between the tubular members 19 and 21, but forms a support for a transversely extending hollow shaft 45 which forms the pivotal connection for the forward wheels. As indicated in FIGS. 1 and 2 of the drawings, the rear ends of the arms 15 and 16 are provided with sleeves or collars 46 and 47 which encircle the shaft 45 and are rotatably supported by suitable bearings or bushings. Plates 49 are bolted or otherwise secured to the shaft 45 to hold the wheel supports 15 and 16 assembled thereupon.

As indicated in FIG. 1 of the drawings, the arms 15 and 16 include rear portions 50 which extend angularly outwardly from the center line 11 of the tractor, and which are connected to parallel forward end portions 51. As can be seen in FIG. 2 of the drawings, the arms 15 and 16 are generally diamond shaped in elevation and are of the greatest vertical height adjoining the bearings 52 which support the front wheel axles 53 extending outwardly therefrom. The wheel supports 15 and 16 are preferably hollow for maximum strength and minimum weight, the forward end 54 of the one of the wheel supports being indicated in FIG. 4 of the drawings. An outwardly extending arm 55 extends laterally from the forward end 54 of each parallel portion 51, and this arm 55 is reinforced by gusset plates 56. The arms 56 are apertured as indicated at 57 to accommodate a pin or clevis which will be later described.

Referring back to FIG. 5, the frame 14 is provided with a pair of brackets 59 and 60 which act as a support for the internal combustion engine 61. A box like frame enclosure 62 is also welded to the frame forwardly of the motor mounting brackets 59 and 60, the frame 62 acting as a support for the floor 65 (See FIG. 9). The tubular frame member 14 also supports a front column 66, 67 which is welded or otherwise secured to the frame as an integral part thereof.

Figure 6:
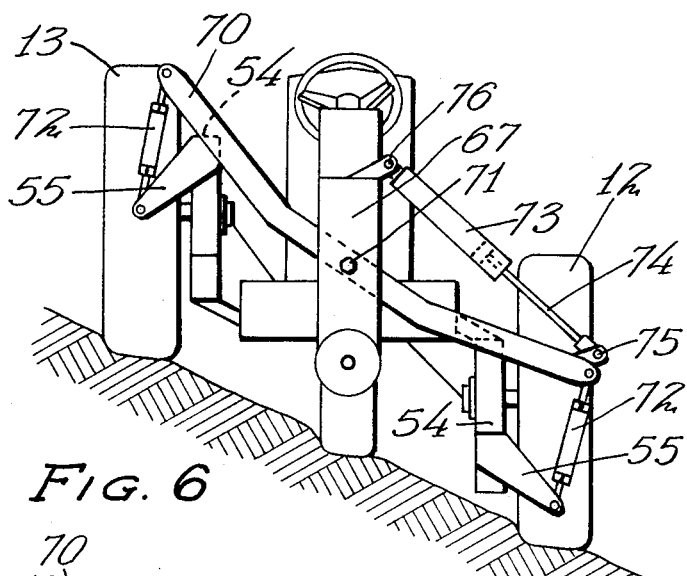
FIG. 6 is a front elevational view of the tractor while travelling along a hillside.
Figure 7:
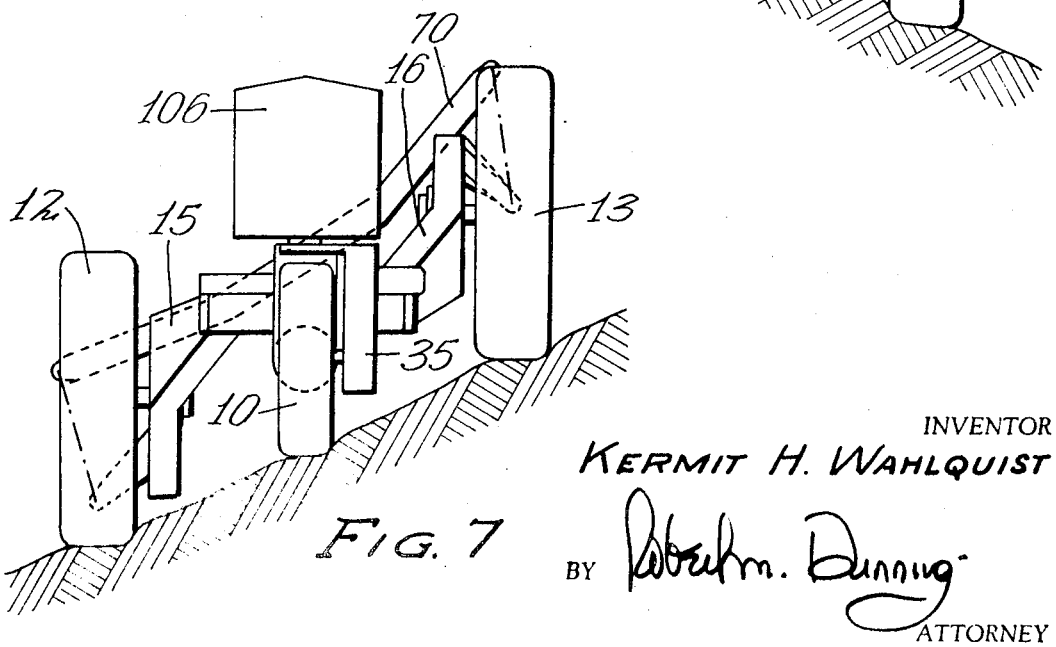
FIG. 7 is a rear view of the tractor while moving along the hillside.

As is perhaps best illustrated in FIGS. 6 and 7 of the drawings, an elongated tubular arm 70 extends between the front and rear sides of the column 66, 67 and is pivotally connected thereto as indicated at 71. The outer ends of the arm 70 are connected to the outwardly projecting arms 55 at the forward end 54 of the wheel supporting arms 15 and 16 by adjustable links 72. The transverse arm 70 is adjustably pivoted by a cylinder, piston arrangement 73, 74 which is pivotally connected at one end 75 to an end of the arm 70, and pivotally connected at its other end 76 to the frame column 66, 67. Movement of the piston within the cylinder 73 in one direction will lower one wheel 12 and raise the other wheel 13 as indicated in FIGS. 6 and 7 of the drawings. Obviously, retraction of the cylinder piston arrangement will act to tilt the wheels in the opposite direction.

The mower unit used in conjunction with the tractor will not be disclosed or described in any great detail in view of the fact that such a unit may vary considerably depending upon the type of unit which is wanted. A pivot bolt 79 (See FIG. 9) extends through the front closure plate of the frame member 19 and is sealed relative thereto. The mower lifting apparatus is indicated in FIGS. 9, 10, 11 of the drawings. A plate 80 is pivotally supported upon the pivot bolt 79 and held in place by a nut or other suitable means 81. The plate 80 is reinforced by integral reinforcing arms 82 which converge together toward the upper end of the plate 80 to support the lifting arm 83 therebetween on a pivot 84. A hollow shaft 85 is supported upon the plate 80 and a pair of spaced lugs 86 extend forwardly from the plate 80 and the shaft 85 as indicated in FIG. 11. The numeral 87 indicates the aperture through which the pivot 79 extends.

As indicated in FIGS. 9 and 10 of the drawings, a hydraulic cylinder 89 is pivotally connected by pivots 90 to the lugs 86 and a piston rod 91 provided with a clevis 92 is pivotally connected at 93 to the arm 83. Expansion of the cylinder, piston unit 89, 91 pivots the arm 83 upwardly. Controlling arms 94 are pivotally connected at 95 to the transverse shaft 85, and are pivotally connected at 96 to the mower which is indicated in general by the letter B. The body of the mower B is connected by chains 97 to suitable points on the mower housing, the points being normally spaced approximately 120° apart as is diagrammatically illustrated in FIG. 8. The mower housing includes forwardly extending arms 99 which support caster wheels 100, and the body may include rollers 101 which hold the mower in proper relation to the surface of the ground.

As will be obvious from the foregoing description, when the piston rod 91 is forced from the cylinder 89, the arm 83 will be swung upwardly raising the mower unit from the surface of the ground. Contraction of the piston into the cylinder 89 will permit the mower to lower to the surface of the ground.

With reference to FIGS. 1 and 2 of the drawings, it will be noted that a fuel tank 105 is mounted beneath a hood 106 which covers the rear end of the apparatus as well as the motor 61. A radiator 107 is mounted rearwardly of the engine 61 and a fan 109 is provided to drive the air through the radiator and through the rear end of the device. A seat 110 is mounted upon the floor 65 as indicated in FIGS. 1 and 2 of the drawings and supports the driver rearwardly of the vertical column 67, 69 and by the various controls which function to control the hydraulic circuit. An angular upright 111 serves as a support for the steering wheel 112 which is located forwardly of the driver's seat 110. The driver's wheel 112 controls a portion of the hydraulic circuit as will be described.

The control for the tilting of the wheels of the apparatus and the raising and lowering of the mower unit is indicated in FIGS. 12 through 15 of the drawings. A pair of valves 141 and 121 are mounted in a manner not illustrated either to the undersurface of the floor 65 or to the base of the frame 62. The tilt and lift unit illustrated in these figures is controlled by a lever 115 which extends through an enlarged hole 116 in the floor 65 so as to prevent interference with the motion of the lever. The structure is somewhat unique in that lateral movement of the lever 115 causes rotation of a bracket plate 117, while forward and reverse movement of the lever 115 is designed to control the lift control valve 121. By way of explanation, it should be said that FIG. 12 is rotated relative to FIG. 13, and the structures may be oriented by the inclined side 119 of the plate 120 which is shown in FIGS. 12 and 13.

The plate 120 is hingedly connected to the ends of the valve 121 controlling the lift cylinder 89 and the tilt controlling valve 141 by means of lugs 122 which extend downwardly from the plate 120 and which are connected to corresponding lugs 123 on the ends of the valves 121 and 141 by aligned pivots 124 and 125. The plate 120 is provided with a slot 126 which is elongated laterally of the plate and of the tractor so as to permit forward and rearward movement of the lever arm 115. The plate 117, shown in exploded position in FIG. 12, is actually in face contact with the undersurface of the plate 120, and has a rounded forward end 127 which permits the plate 117 to rotate relative to the plate 120. Pivot holes 129 and 128 are provided in the plates 120 and 117 so that the plate 117 rotates about the axis of the pivot bolt 130 inserted through the plate 120 and the underlying plate 117. The plate 117 is provided with a longitudinally elongated slot 131 through which the rod 115 extends. A clevis 132 is provided at the lower end of the control lever 115 as indicated in FIGS. 12 and 15 of the drawings. As indicated in FIG. 15, the clevis 132 is pivotally connected at 133 to a piston rod 114a within the lift valve 121. The arrangement described is such that when the lever 115 is moved forwardly, the lift valve 121 will cause the lever arm 83 controlling the mower unit to raise and thus lift the mower out of contact with the ground. Rearward movement of lever 115 lowers the mower. A lateral movement of the lever 115 will pivot the plate 117 about its axis 130, and this pivotal movement will cause the integral arm 138 to act through the link 134 and connecting pin 135 to move the valve rod 140 in a direction to actuate the tilt valve 141 in a direction to tilt the wheels in one direction or the other. In other words, as the lever 115 is drawn to one side, the front wheel on one side of the tractor will lower and the front wheel on the other side of the tractor will raise a corresponding distance. Movement of the lever 115 in the opposite direction will cause an opposite tilt of the apparatus.

Figure 16:
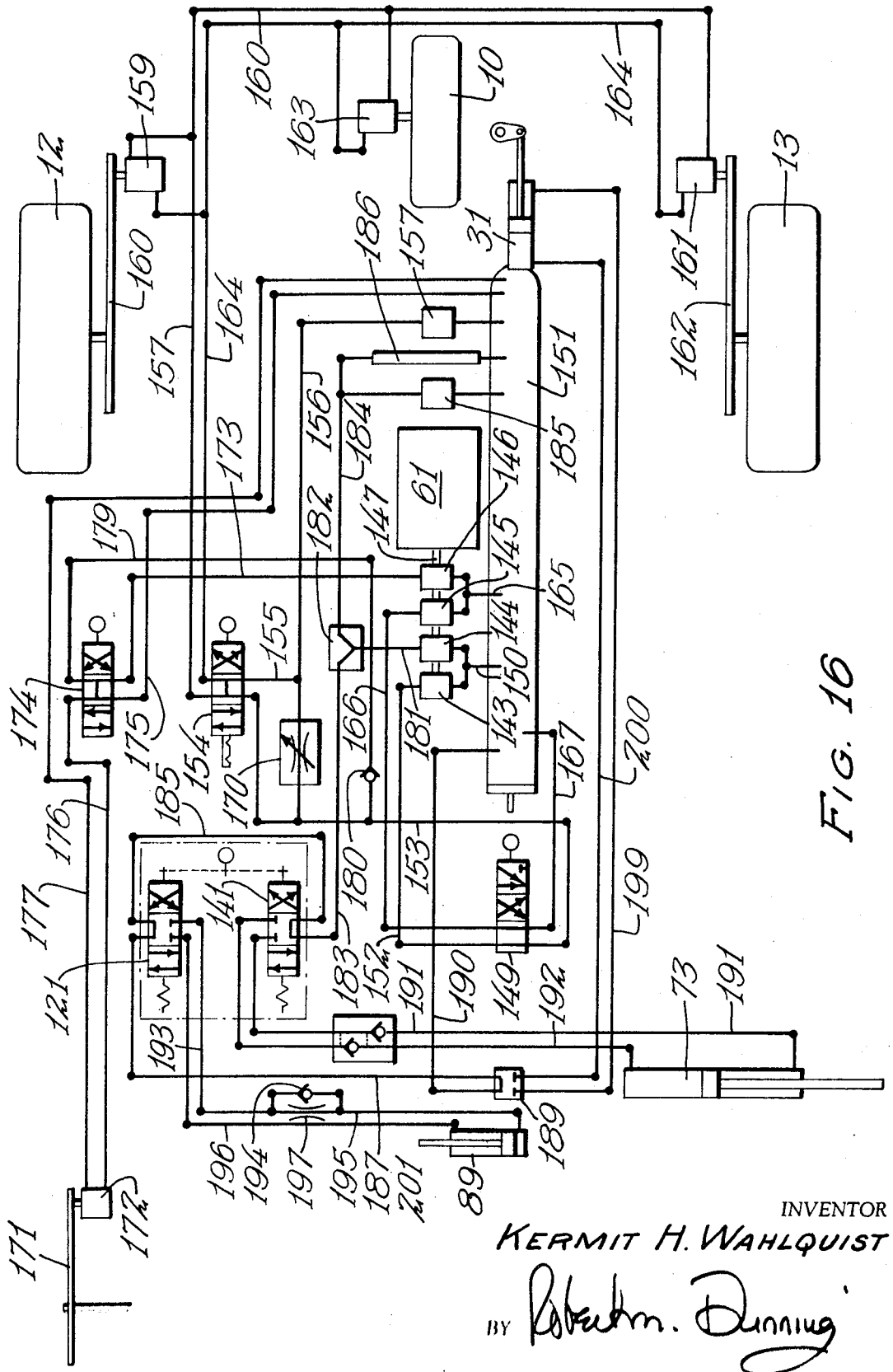

The diagram for operating the various units is indicated in FIG. 16 of the drawings. As is diagramatically illustrated in this Figure, the internal combustion engine 61 operates a series of pumps which are indicated in general by the numerals 143, 144, 145 and 146. The pumps are connected to the driveshaft 147 of the engine 61 and are rotated thereby.

The speed selector valve is indicated by the numeral 149. This valve 149 is capable of delivering fluid to the transport motors at three selected speeds. In the arrangement illustrated in full lines in FIG. 16 of the drawings, the pump 143 draws fluid from the tank 151 which forms the reservoir through the line 150 and forces hydraulic fluid through the conduit 152 and the selector valve 149 to the line 153 which leads to the forward and reverse valve 154. If the valve 154 is in its intermediate position, the fluid is directed through the return lines 155 and 156 to the reservoir or tank 151 through the filter 157. On the other hand, if the forward and reverse valve 155 is moved to the right as indicated in this figure, fluid is directed through the line 157 to the transport motor 159 connected by the chain 160 to drive the wheel 12. The fluid line 157 is also connected to the line 160 leading to suitable transport motor 161 connected by suitable means 162 to the forward wheel 13. The fluid from the line 157 and 161 is also directed to the hydraulic motor 163 connected to the steering wheel 10 so that all of the drive wheels are subjected to fluid under pressure from the pump 143. The return line 164 from the transport motors 161, 163 and 159 leads through the valve 154 to the return lines 155 and 156, leading through the filter 157 to the reservoir 151.

When the forward and reverse valve 154 is moved to the left from its neutral position illustrated, the fluid from the pump 143 flows through the selector valve 149 and conduit 153 to the conduit 164, directing flow in the opposite direction to the motors 159, 161 and 163. In this event, the conduit 157 forms the return line and is connected through the valve 154 to the return lines 155 and 156 and to the reservoir. Thus when the valve 154 is moved in one direction, the tractor will be moved in a forward direction and when the tractor is moved in the opposite direction, the tractor will be driven in a reverse direction. In practice, the arrangement is such that the lever controlling the valve 154 is moved forwardly to move the tractor in a forward direction and moved rearwardly to drive the tractor in a reverse direction. With the valve 154 is in the intermediate or neutral position, the lines 157 and 164 are interconnected at the valve 154, allowing fluid to flow freely through motors 159, 161 and 163, allowing the drive wheels 12, 13 and 10 to free wheel. When the selector valve 149 is in the position illustrated, the larger capacity pump 145 pumps fluid from suction line 165 through the conduit 166 through the selector valve 149 and the return line 167 to the reservoir 151. Valve 154 is held in a selected position by detent means.

When the selector valve 149 is in its intermediate position, the fluid pumped by the pump 143 flows through the conduit 152 to the selector valve 149 and is directed by this valve to the return line 167 to the reservoir 151. The pressure line 166 from the pump 145 is directed by the valve 149 to the conduit 153 leading to the forward and reverse valve 154. This valve 154 by-passes the fluid back to the reservoir if the valve is in its intermediate position, or else directs fluid under pressure either through the conduit 157 or the conduit 164 to the transport motors 159, 161 and 163 to selectively drive the tractor in a forward or reverse direction.

When the selector valve 149 is in its third position, the fluid from both pumps 143 and 145 are directed through the conduits 152 and 166 to the valve, and the discharge of both pumps is directed to the conduit 153. The combined output of both pumps is then by-passed back to the reservoir, or directed to either of the conduits 157 or 164 to drive the transport motors. As the output of the pump 145 is greater than the output of the pump 143, the selector valve 149 thus provides a selection of three speeds in either a forward or reverse direction.

A clutch 170 is incorporated in the circuit and is controlled by a suitable clutch pedal. The clutch is connected between the conduit 153 and the return conduit 156. When the clutch pedal is depressed, fluid may flow directly from the pressure conduit 153 through the clutch 170 to the return line 156 so that fluid will not flow to the transport motors regardless of the position of the forward and reverse valve 154. The clutch 170 is capable of diverting either all of the fluid under pressure to the reservoir, or deflecting only a portion thereof to the reservoir. Thus when the clutch pedal is partially depressed, a part of the fluid may flow through the forward and reverse valve 154 to the transport motors, driving these motors at a reduced speed. The clutch therefor serves as a variable speed valve. This reduced speed is helpful when maneuvering the tractor in close quarters, as it permits the operator to maintain full engine speed for maximum speed and efficiency of the power take-off driven equipment. The clutch control is normally not intended for continuous use as the constriction through the valve has a tendency to raise the fluid temperature. However, it is extremely effective where temporary speed reductions are desired.

The power take-off of the tractor s indicated diagrammatically at 171, and is driven by a hydraulic motor 172. The hydraulic fluid used to drive the motor 172 is generated by the pump 146, the inlet of which is connected to the suction line 165. The pump 146 drives fluid through a conduit 173 to the power take-off valve 174 which is movable to a rear position, a forward position, or a central or neutral position. When in the central position illustrated in the drawings, the fluid conduit 173 is connected to a return line 175 leading to the reservoir 151. When moved to the left or into the rear position, the fluid from the pressure line 173 is directed to a conduit 176 leading to the P.T.O. motor 172. The outlet of the motor 172 is connected by a return line 177 to the reservoir 151.

When the P.T.O. valve 174 is in its opposite or forward position, the fluid from the pressure line 173 is directed to a conduit 179 leading through a check valve 180 to the pressure line 153 leading to the forward and reverse valve, and through this valve to the transport motor to provide in effect a fourth speed. This may be considered a transport speed to drive the tractor more swiftly when the P.T.O. is not in use.

The fourth pump 144 is used to supply hydraulic fluid for the accessory circuit of the tractor including power steering, the tilting of the tractor, and the lifting and lowering of the mower. The pump 144 is connected to the suction line 150 and the fluid is forced through the conduit 181 to a constant volume priority type flow divider 182. For example, the pump 144 may produce a fluid volume of 11 gallons per minute, six of which flow constantly through its pressure line 183 with the remaining fluid flowing through a return line 184 to a filter 185 and radiator or heat exchanger 186 which are connected in parallel between the line 184 and the reservoir 151. The line 183 flows to a valve 141 controlling the tilt cylinder 73. A continuation of the line flows through the conduit 185 to the valve 121 controlling the lift cylinder 89. A continuing conduit 187 extends to a valve 189 controlling the steering cylinder 31. When the tilt valve 141 is in the central position illustrated, fluid flows from the pressure line 183 through conduit 185 to the lift valve 121. If the lift valve 121 is in its neutral position as illustrated, the fluid continues to the steering switch or valve 189. If the valve 189 is in its inactive position, the fluids may return through the return conduit 190 to the reservoir 151. When the valve 141 is moved to the right from the position shown in FIG. 16, the pressure line 183 is connected to a conduit 191 leading to one end of the tilt cylinder 73. The other end of the cylinder 73 is connected by conduit 192 back to the valve 141 and into the conduit 185. When the valve 141 is moved to the left from the position shown, fluid from the pressure line 183 flows through the conduit 192 to the other end of the cylinder 73, the fluid returning through the conduit 191.

When the lift control valve 121 is moved to the right, fluid under pressure from the line 185 will flow through a conduit 193, past a check valve 194 and through a conduit 195 to the lower end of the lift cylinder 89 tending to lift the mower. The fluid from the upper end of the cylinder 89 is forced through the line 196 to the valve 121 and to the conduit 187 leading through the steering valve 189 to the reservoir. When the lift valve 121 is moved to the left from the central position indicated in FIG. 16, fluid under pressure from the conduit 185 will be directed to the conduit 196 leading to the upper end of the cylinder 89. A restriction 197 is provided between the conduits 193 and 195 and in parallel with the check valve 194. The return fluid from the bottom end of the cylinder 89 must flow through the restriction 197 to return to the valve 121, accordingly slowing down the speed at which the mower is lowered to the ground.

The valve 189 is controlled by movement of the steering wheel 112. When the steering wheel is turned in one direction, fluid pressure from the conduit 187 will flow through the valve 189 to a conduit 199 leading to one end of the steering cylinder 31, the fluid in the other end of the cylinder returning through conduit 200 to the valve 189 and being directed through conduit 190 to the reservoir. When the steering wheel is rotated in the other direction, the fluid under pressure will flow through the conduit 200 to move the piston in the cylinder 31 in the opposite direction, the fluid returning through the conduit 199.

For safety purposes, a double pilot operated check valve is provided in the conduits 191 and 192 leading to the cylinder 113. This valve prevents the machine from being tilted in the event of hose breakage or hydraulic failure. In the event the pressure line from the pump 144 to the tilt cylinder control valve becomes broken or disconnected the tilt cylinder 113 automatically remains in the same position until pressure is restored.

The wheels 12 and 13 are provided with brake discs 202 which are acted upon by brake cylinders 203 controlled by suitable brake pedal 204 indicated in FIG. 1. As the brakes function in a conventional manner, they are not shown in detail. The clutch pedal 205 for operating the clutch 170 is also visible in FIG. 1. The engine throttle lever which controls the engines speed is indicated at 206 in FIG. 2. The speed range selector valve is controlled by the lever 207 also in FIG. 2.

The lever 115 which controls the tilt cylinder and lift cylinder is positioned forwardly of the seat 110 and to the right thereof. The forward and reverse control lever 209 as well as the P. T. O. and transport speed control lever 210 are also to the right of the operator's seat 110. As will be noted all of the controls are conveniently located for operation by the operator.

The pressure lines 157 and 164 to the hydraulic transport motors 159, 161 and 163 are common. As a result, if the tractor turns, the fluid to one motor may increase with a corresponding decrease to the others. Thus the hydraulic system functions in the manner of a differential, to permit one wheel to travel faster or slower as required.

In accordance with the Patent Office Statutes, I have described the principles of construction and operation of my improvement in hillside tractors, and while I have endeavored to set forth the best embodiment thereof, I desire to have it understood that changes may be made within the scope of the following claims without departing from the spirit of my invention.

I claim:

1. A hillside tractor including:
   an elongated tubular member extending from front to rear along the longitudinal center-line of said tractor and forming the main support,
   a wheel supporting one end of aid tubular member and pivotally supported upon a wheel supporting member, said wheel supporting member being connected to said tubular member along a substantially vertical axis,
   a pair of wheel supporting arms pivotally supported on a common axis on opposite sides and intermediate said tubular member, said common axis extending generally transverse to said tubular member, said supporting arms extending lengthwise of the tubular member from the pivot points,
   wheels supported on said arms on axes parallel to, and spaced equidistant from, said common axis,
   means connecting said arms for simultaneously pivoting one arm upwardly and the other arm downwardly,
   hydraulic pump means supported by said tubular member,
   drive means supported by said tubular member and connected to said pump means to drive the same, hydraulic drive motors connected to said wheels to drive the same, and connected to said pumps to receive fluid therefrom, and said tubular member serving as a reservoir for hydraulic fluid pumped by said pumps.

2. The structure of claim 1 and in which an end of said tubular member inclines upwardly to support a steering platform to which said first mentioned wheel is pivotally connected.

3. The structure of claim 1 and in which said drive means comprises an internal combustion engine.

4. The structure of claim 1 and in which said last named wheels are supported on axles extending outwardly in opposed relation from said wheel supporting arms.

5. The structure of claim 1 and in which said pumps and said drive means are substantially centered relative to a vertical plane through the axis of said tubular member.

6. The structure of claim 1 and in which said means connecting said arms is hydraulically operated by said hydraulic pump means, and in which said means connecting said arms is held from movement in the absence of hydraulic fluid from said pump means.

7. The structure of claim 1 and in which said pump means includes a series of pumps.

8. The structure of claim 7 and in which said series of pumps include two pumps of different capacity, and control means for selectively connecting the output of either or both of said two pumps to said hydraulic motors to drive the same.

9. The structure of claim 7 and including a hydraulic power take-off motor and including two pumps of said series are of different capacity, and control means for selectively connecting the output of either or both of said two pumps to said hydraulic drive motors to drive the same, and a third pump in said series, and means selectively connecting said third pump to said power take-off motor or to said drive motors to supplement the fluid flowing from said two pumps.

* * * * *